United States Patent [19]

Sato et al.

[11] Patent Number: 4,713,767
[45] Date of Patent: Dec. 15, 1987

[54] APPARATUS FOR CALCULATING POSITION OF VEHICLE

[75] Inventors: Akira Sato; Kazuo Sato; Takaharu Saito; Junkoh Shima; Kansei Mizutani; Toshimasa Mikawa, all of Toyota, Japan

[73] Assignee: Toyota Jidosha Kabushiki Kaisha, Toyota, Japan

[21] Appl. No.: 730,572

[22] Filed: May 6, 1985

[30] Foreign Application Priority Data

May 9, 1984 [JP] Japan .................................. 59-92590
Nov. 13, 1984 [JP] Japan ................................ 59-239246

[51] Int. Cl.<sup>4</sup> ............................................. G06F 15/50
[52] U.S. Cl. ..................................... 364/453; 364/449; 364/454; 364/571; 340/988; 340/993
[58] Field of Search ............... 364/443, 444, 449, 450, 364/454, 453, 460, 571; 73/178 R; 340/988, 989, 991, 993; 342/450, 451

[56] References Cited

U.S. PATENT DOCUMENTS

| | | | |
|---|---|---|---|
| 3,603,775 | 9/1971 | Galloway | 364/450 |
| 3,702,477 | 11/1972 | Brown | 364/453 |
| 3,739,383 | 6/1973 | Perot et al. | 364/453 |
| 4,513,378 | 4/1985 | Antkowiak | 364/450 |

*Primary Examiner*—Gary Chin
*Attorney, Agent, or Firm*—Cushman, Darby & Cushman

[57] ABSTRACT

A vehicle position calculating apparatus has relative position calculating means for calculating a relative vehicle position with respect to a reference position and absolute position calculating means for calculating an absolute vehicle position from fixed-station absolute position information and vehicle bearing information which are obtained from a radio wave transmitted from a fixed station and the above-described relative vehicle position. The relative position calculating means includes means for calculating a present vehicle position by employing absolute positions successively obtained as new reference positions. Accordingly, it is possible to accurately obtain an absolute present vehicle position.

21 Claims, 12 Drawing Figures

APPARATUS FOR CALCULATING POSITION OF VEHICLE

BACKGROUND OF THE INVENTION

1. Field of the Invention

The present invention relates to a vehicle position calculating apparatus which is capable of accurately providing the position of a vehicle by employing a combination of an inertial navigation method and a radio navigation method.

2. Description of the Prior Art

An ordinary inertial navigation method employs signals respectively delivered from a traveled-distance sensor and a bearing sensor (a yaw-rate sensor or a terrestrial-magnetic sensor) to carry out a cumulative calculation, thereby obtaining the position of a vehicle.

However, since the inertial navigation method uses a cumulative calculation, possible errors in the signals received from the traveled-distance sensor and the bearing sensor are undesirably accumulated. Accordingly, as the distance traveled by the vehicle increases, the error in calculation of the vehicle position increases cumulatively.

When a terrestrial-magnetic sensor is employed as the bearing sensor, this problem is most particularly aggravated. This is because the direction of the terrestrial magnetism may be offset from the magnetic north by the vehicle's own presence or by surrounding obstructions such as buildings, steel bridges or tunnels, and the signal from the terrestrial-magnetic sensor per se may have a large error, which fact may lead to a remarkably large accumulated error.

On the other hand, when a yaw-rate sensor is employed as the bearing sensor, since only a relative direction is known, it is necessary for the driver of the vehicle to input positional information about two points. This positional information also involves errors which may add to the accumulated error.

Even when the terrestrial-magnetic sensor is employed, it is necessary for the driver to input initial positional information, which fact may cause the accumulated error to be further increased in the same manner as the above.

SUMMARY OF THE INVENTION

In view of the above-described problems of the prior art, it is a primary object of the present invention to provide a vehicle position calculating apparatus capable of accurately providing the position of a vehicle by employing a combination of an inertial navigation method and a radio navigation method.

To this end, the present invention provides a vehicle position calculating apparatus comprising, as shown in FIG. 1: relative position calculating means 14 for calculating the relative position of a vehicle with respect to a reference position by employing signals respectively delivered from a traveled-distance sensor 10 and a bearing sensor 12; absolute position calculating means 18 for calculating the absolute position of the vehicle from fixed station absolute position information and vehicle bearing information which are obtained from a radio wave transmitted from a fixed station and the above-described relative vehicle position; and correction constant calculating means 20 for calculating a correction constant by obtaining the relationship of a vector $\vec{AB}$ with respect to a vector $\vec{AB'}$ in which A and B represent absolute positions calculated by the absolute position calculating means 18, and B' represents a position calculated by the relative position calculating means 14 with the absolute position A employed as a reference position, the position B' corresponding to the absolute position B, wherein the relative position calculating means 14 is adapted to calculate the present position P of the vehicle by employing as a reference position an absolute position C calculated by the absolute position calculating means 18, together with the calculated correction constant.

DESCRIPTION OF THE PREFERRED EMBODIMENT

The basic principle of the present invention will first be described hereinunder in the case where a yaw-rate sensor is employed as the bearing sensor.

Figure 1:
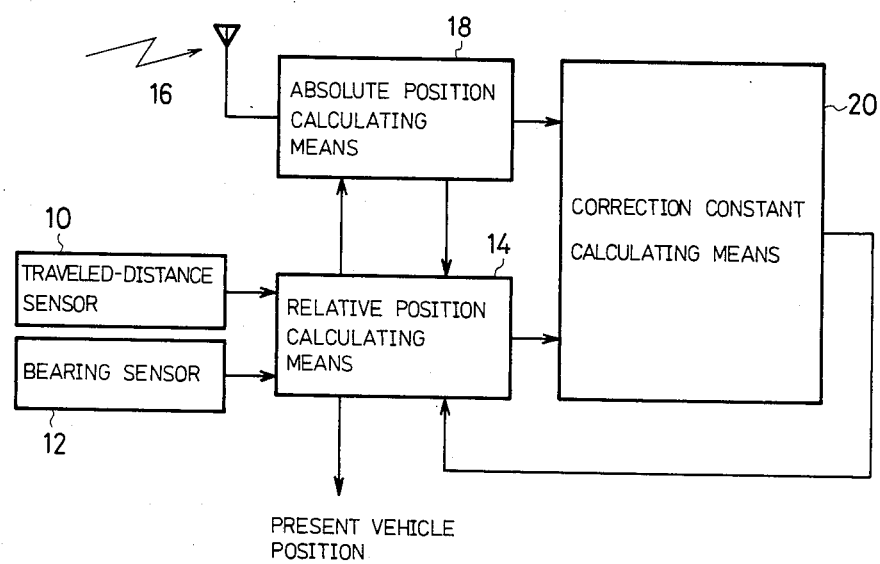
FIG. 1 is a block diagram of a principal arrangement of the vehicle position calculating apparatus according to the present invention.
Figure 2:
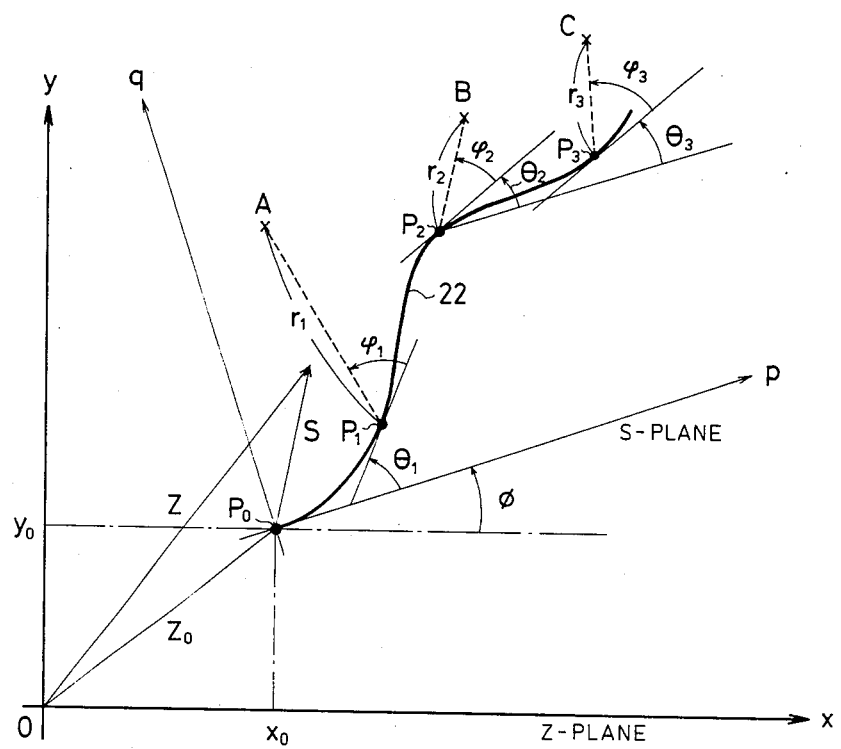
FIGS. 2 to 4 are graphs employed to describe the basic principle of the present invention.

Referring to FIG. 2 which shows the locus 22 of a vehicle, it is assumed that the vehicle starts from an initial position $P_0$ and successively passes through positions $P_1$, $P_2$ and $P_3$. It is further assumed that the vehicle receives radio waves at the positions $P_1$, $P_2$ and $P_3$, respectively transmitted from fixed stations A, B and C. The angles $\phi_1$, $\phi_2$ and $\phi_3$ of arrival of the respective radio waves are measured with respect to the advancing direction of the vehicle at those positions by means of a directive antenna which is provided on the vehicle. With a predetermined geographical x-y orthogonal coordinate system employed as an absolute coordinate system, a position (x, y) is represented by a complex number $Z=x+iy$. On the other hand, a relative coordinate system is formed by a p-q orthogonal coordinate system in which the origin is defined by the initial position $P_0$ and the p-axis is plotted in the vehicle advancing direction as determined at the initial position $P_0$. With respect to the relative coordinate system, a position (p, q) is represented by a complex number $S=p+iq$. Further, similar relative coordinate systems are formed by employing the positions $P_1$, $P_2$ and $P_3$ as the respective origins. The positions of the fixed stations A, B and C represented by the respective relative coordinate systems are denoted by $r_1 e^{i\phi_1}$, $r_2 e^{i\phi_2}$ and $r_3 e^{i\phi_3}$.

The coordinate transformation formula employed to effect transformation from the S-plane to the Z-plane is given as follows:

$$Z = Z_0 + S e^{i\Phi} \qquad (1)$$

where $Z_0$ represents complex coordinates of $P_0$ in the absolute coordinate system and is expressed by $Z_0 = x_0 + iy_0$, while $\Phi$ represents the angle of rotation of the p-axis with respect to the x-axis.

By applying the formula (1), the respective positions of the fixed stations A, B and C are expressed as follows:

$$Z_A = Z_0 + (S_1 + r_1 e^{i(\phi_1 + \theta_1)}) e^{i\phi} \qquad (2)$$

$$Z_B = Z_0 + (S_2 + r_2 e^{i(\phi_2 + \theta_2)}) e^{i\phi} \qquad (3)$$

$$Z_C = Z_0 + (S_3 + r_3 e^{i(\phi_3 + \theta_3)}) e^{i\phi} \qquad (4)$$

where $S_1$, $S_2$ and $S_3$ are complex coordinates of the positions $P_1$, $P_2$ and $P_3$ on the S-plane, while $\theta_1$, $\theta_2$ and $\theta_3$ are angles which respectively express the vehicle advancing direction at the positions $P_1$, $P_2$ and $P_3$ with respect to the p-axis.

The position (p, q) of the vehicle in the relative coordinate system is obtained by the following formulae:

$$p = \int \cos\theta \, dl \qquad (5)$$

$$q = \int \sin\theta \, dl \qquad (6)$$

where $\theta$ represents the angle which expresses the vehicle advancing direction with respect to the p-axis. The angle $\theta$ may be calculated by employing the yaw rate $\omega$ which is detected by the yaw-rate sensor from the following formula:

$$\theta = \int \omega \, dt \qquad (7)$$

Further, in the formulae (5) and (6), dl represents an infinitesimally small unit of distance traveled by the vehicle which can be detected by the traveled-distance sensor. It is to be noted that, when a vehicle-speed sensor is employed as the traveled-distance sensor, dl is obtained by setting dl such as to equal Vdt (dl=Vdt), where V is the vehicle speed, while dt represents the period of time required for the vehicle to advance a distance d.

It will be proved hereinunder that it is possible to obtain $Z_0$ and $\Phi$ in the coordinate transformation formula (1) from the formulae (2), (3) and (4).

In the formulae (2), (3) and (4), the respective complex coordinates $Z_A$, $Z_B$ and $Z_C$ of the fixed stations A, B and C in the absolute coordinate system are already known, and it is possible to detect the vehicle advancing angles $\theta_1$, $\theta_2$ and $\theta_3$ at the positions $P_1$, $P_2$ and $P_3$ with respect to the p-axis by means of the yaw-rate sensor. Further, it is possible to detect the radio wave arrival angles $\phi_1$, $\phi_2$ and $\phi_3$ at the respective positions $P_1$, $P_2$ and $P_3$ with respect to the vehicle advancing direction at these positions by means of the directive antenna provided on the vehicle. Accordingly, the formulae (2), (3) and (4) involve a total of six unknown numbers, that is, $Z_0$, $\Phi$, $r_1$, $r_2$ and $r_3$ (where $Z_0$ includes two numbers, that is, $x_0$ and $y_0$). Additionally, the formulae (2), (3) and (4) are complex and, therefore, there are six independent formulae ($3 \times 2 = 6$). Thus, it has been proved that it is possible to obtain $Z_0$ and $\Phi$ in the coordinate transformation formula (1) from the formulae (2), (3) and (4).

Figure 3:
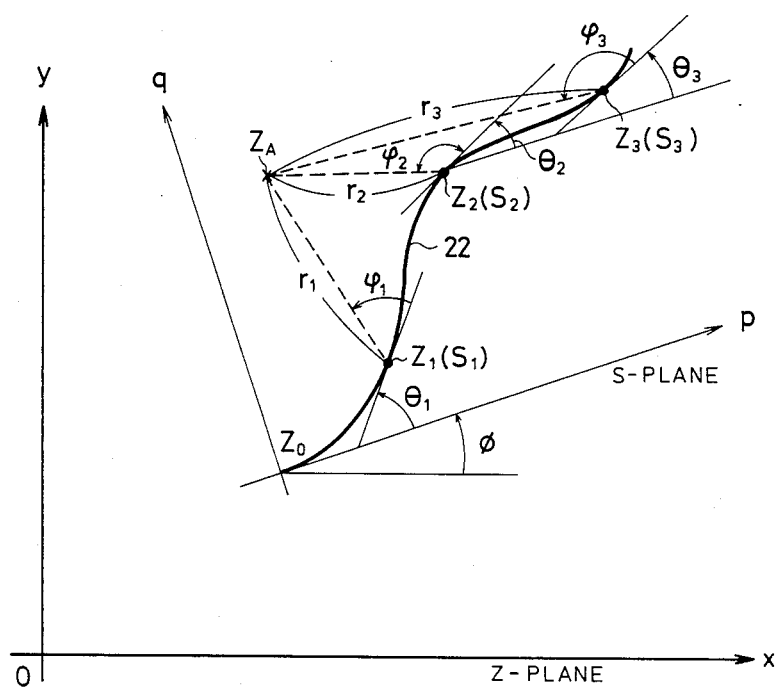

The above-described relationship holds even when there is only one fixed station, as shown in FIG. 3. In such a case, the condition of $Z_A = Z_B = Z_C$ is valid in the formulae (2), (3) and (4).

From the facts described above, it may be concluded as follows.

Conclusion 1

When a yaw-rate sensor is employed as the bearing sensor, it becomes possible for a relative vehicle position obtained by an inertial navigation method alone to be transformed into an absolute vehicle position by detecting radio wave arrival angles at three different points with respect to the vehicle advancing direction at these points.

When the vehicle is at rest, however, the absolute position of the vehicle is obtained simply by detecting angles of arrival of the radio waves respectively transmitted from three different fixed stations (in this case, $S_1 = S_2 = S_3$ and $\theta_1 = \theta_2 = \theta_3 = 0$ are valid in the formulae (2), (3) and (4)).

The following is a description of the basic principle of the present invention in the case where a terrestrial-magnetic sensor is employed as the bearing sensor.

When a terrestrial-magnetic sensor is employed, the absolute bearing of the vehicle advancing direction is known. It is therefore possible to plot the p-axis in the x-axis direction (e.g., the eastward direction) in FIGS. 2 and 3. Accordingly, it is possible to set $\Phi$ such as to equal zero ($\Phi = 0$). In consequence, it is possible to obtain $Z_0$ by employing the formulae (2) and (3) alone. This is because, in this case, there are only four unknown numbers, that is, $Z_0$ ($= x_0 + iy_0$), $r_1$ and $r_2$, and only four independent formulae ($2 \times 2 = 4$).

Conclusion 2

When a terrestrial-magnetic sensor is employed as the bearing sensor, it becomes possible for a relative vehicle position obtained by an inertial navigation method alone to be transformed into an absolute vehicle position by detecting radio wave arrival angles at two different points with respect to the vehicle advancing direction at these points.

However, when the vehicle is at rest, the absolute position of the vehicle is obtained simply by detecting the directions of arrival of the radio waves respectively transmitted from two different fixed stations (in this case, $S_1 = S_2$ and $\theta_1 = \theta_2$ are valid in the formulae (2) and (3)).

In the above discussion, the angles of arrival of the radio waves respectively transmitted from the fixed stations are detected on the vehicle side. The following is a description of a detection method in which the vehicle receives from the fixed station by means of a radio wave information about a bearing angle u of the vehicle position as viewed from a fixed station (this bearing angle will be referred to as a "vehicle bearing angle", hereinafter).

In such a case, the following formulae are established in correspondence with the formulae (2), (3) and (4) (see FIG. 4):

$$Z_A = Z_0 + S_1 e^{i\Phi_1} + r_1 e^{i\mu_1} \qquad (8)$$

$$Z_B = Z_0 + S_2 e^{i\Phi_2} + r_2 e^{i\mu_2} \qquad (9)$$

$$Z_C = Z_0 + S_3 e^{i\Phi_3} + r_3 e^{i\mu_3} \qquad (10)$$

With respect to these formulae, the numbers of unknown numbers and independent formulae are similar to those in the above discussion, and Conclusions 1 and 2 are valid. However, in Conclusions 1 and 2, the radio wave arrival angle is to be replaced with the vehicle bearing angle.

Figure 4:
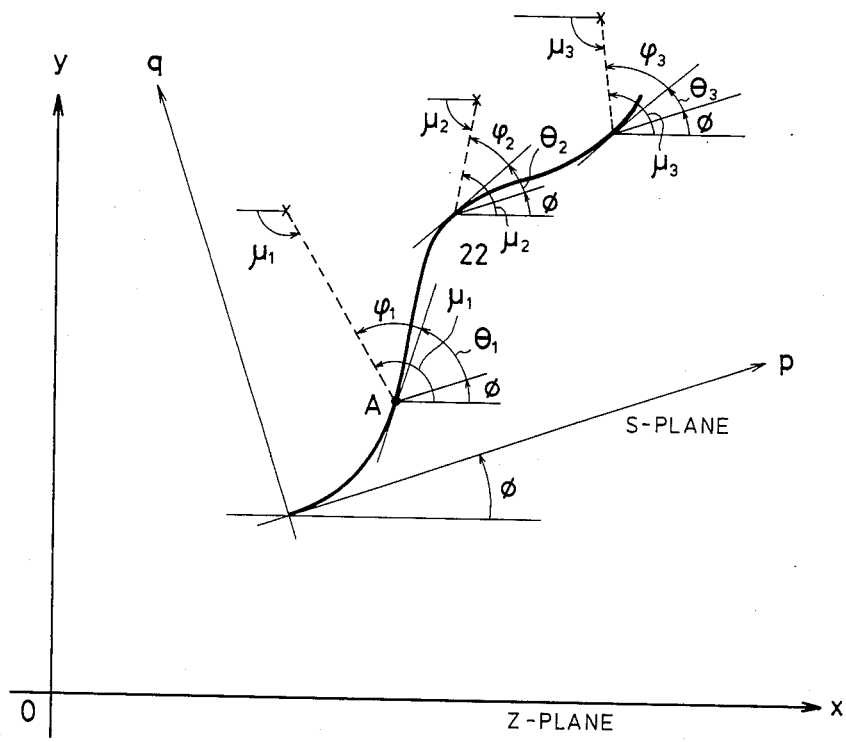

A description will now be made of a case where the angle $\Phi$ of arrival of the radio wave transmitted from a fixed station is detected on the vehicle side and the vehicle receives information about the vehicle bearing angle μ from the fixed station. In this case, the value of Φ is, as shown in FIG. 4, easily obtained as follows:

$$\Phi = \mu i - \phi i - \theta i (i = 1, 2 \ldots) \quad (11)$$

Accordingly, it is possible to obtain $Z_0$ from the formulae (8) and (9) alone even when a yaw-rate sensor is employed as the bearing sensor.

Conclusion 3

Even when a yaw-rate sensor is employed as the bearing sensor, it becomes possible for a relative vehicle position obtain by an inertial navigation method alone to be transformed into an absolute vehicle position by detecting radio wave arrival angles and vehicle bearing angles at two different points.

When the vehicle is at rest, however, the above-described "two different points" should be changed into "two different fixed stations" (in this case, the condition of $\theta i = 0$ is valid in the formula (11), while the condition of $S_1 = S_2$ holds in the formulae (8) and (9)).

The present inventors conducted the theoretical analyses described above and accomplished the present invention on the basis of the analyses.

The operation of the present invention will now be described with reference to FIGS. 5 and 6.

Figure 5:
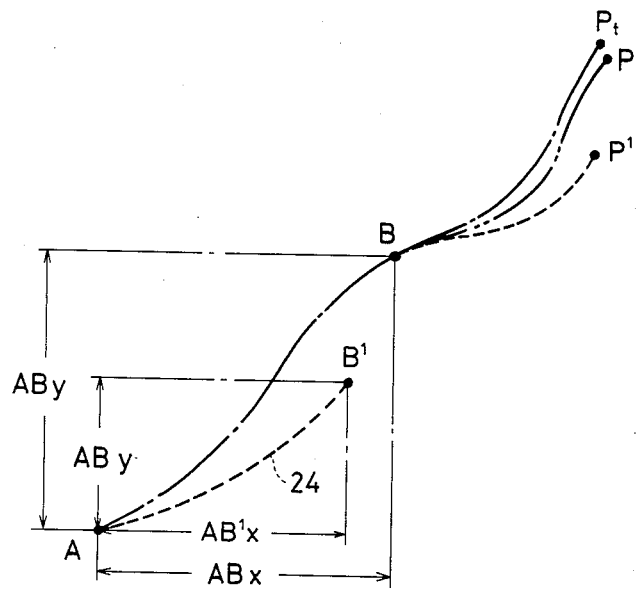
FIGS. 5 and 6 are graphs employed to describe the operation of the present invention.
Figure 6:
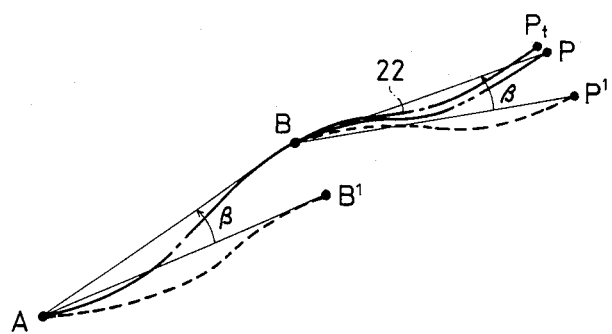

Referring first to FIG. 5, a locus 24 is shown which has been obtained by an ordinary inertial navigation method by the relative position calculating means 14 with a calculated absolute position A employed as a reference position and without any correction constant being taken into consideration. On the other hand, an absolute position B is calculated by the absolute position calculating means 18 and corresponds to a position B'. As explained in the above description of the principle of the present invention, the absolute position B is obtained by setting up a coordinate transformation formula and coordinate-transforming a relative position into an absolute position. For example, with respect to three points, that is, the positions B and A and another position (not shown) which precedes the position A, $Z_0$ and Φ are obtained through the formulae (2), (3) and (4), and $S_3$ (assumed to be complex coordinates corresponding to the point B) is substituted in the formula (1) to thereby obtain the absolute position B (the value of Z). The same is the case with the absolute position A.

However, the position B is more accurate than the position B', and these positions do not generally coincide with each other, although they are supposed to be the same position. Accordingly, when the locus of the vehicle is displayed on a CRT, the locus discontinously changes from the position B' to the position B. This is because the locus 24 of the vehicle as far as the position B' has been obtained by the inertial navigation method and the accumulated error consequently increases with an increase in the distance from the position A.

To cope with the above-described problem, for example, the following correction constants Kx and Ky are obtained by the correction constant calculating means:

$$Kx = ABx/AB'x$$

$$Ky = ABy/AB'y$$

where ABx represents the x-component in the vector $\overrightarrow{AB}$ in an x-y orthogonal coordinate system such as that shown in FIG. 5, while ABy represents the y-component in the vector $\overrightarrow{AB}$ in the x-y orthogonal coordinate system. The same is the case with AB'x and AB'y.

The locus of the vehicle from the position B is obtained as follows. In FIG. 5, the reference symbol P' represents a present vehicle position calculated by the relative position calculating means 14 with the position B employed as a reference position and without any correction constant being taken into consideration. A position P which corresponds to and is more accurate than the position P' is obtained as $BPx = Kx \cdot BP'x$ and $BPy = Ky \cdot BP'y$.

The thus obtained position P is closer than the position P' to a position Pt which would be obtained by carrying out calculation on the basis of the radio wave information received at the position P. In other words, the locus of the vehicle becomes more continuous, and the accuracy is increased. This is because the correction constants work in such a manner as to take into consideration the tendency for errors to occur.

Various correction constants may be considered in addition to the above-described ones. For example, when the degree of accuracy of the traveled-distance sensor is higher than that of the bearing sensor, as shown in FIG. 6, the angle β of the vector $\overrightarrow{AB}$ with respect to the vector $\overrightarrow{AB'}$ is employed as a correction constant, and the position P' is corrected into the position P in the vector $\overrightarrow{BP}$ which is obtained by rotating the vector $\overrightarrow{BP'}$ by the angle β. In this case, the positions A, B, P and P' are the same as those described above (the positions shown in FIG. 5).

On the other hand, when the degree of accuracy of the bearing sensor is much higher than that of the traveled-distance sensor, it is possible to employ $L = AB/AB'$ as a correction constant. In this case, AB represents the distance between the positions A and B, while AB' represents the distance between the positions A and B'. The position P' is corrected into the position P in the vector $\overrightarrow{BP} = L \cdot \overrightarrow{BP'}$.

Further, it is possible to employ the above-described β and L as correction constants and correct the position P' into the position P in the vector $\overrightarrow{BP}$ which is obtained by rotating the vector $L \cdot \overrightarrow{BP'}$ by the angle β.

One embodiment of the vehicle position calculating apparatus according to the present invention will be described hereinunder with reference to the drawings infra FIG. 7.

Figure 7:
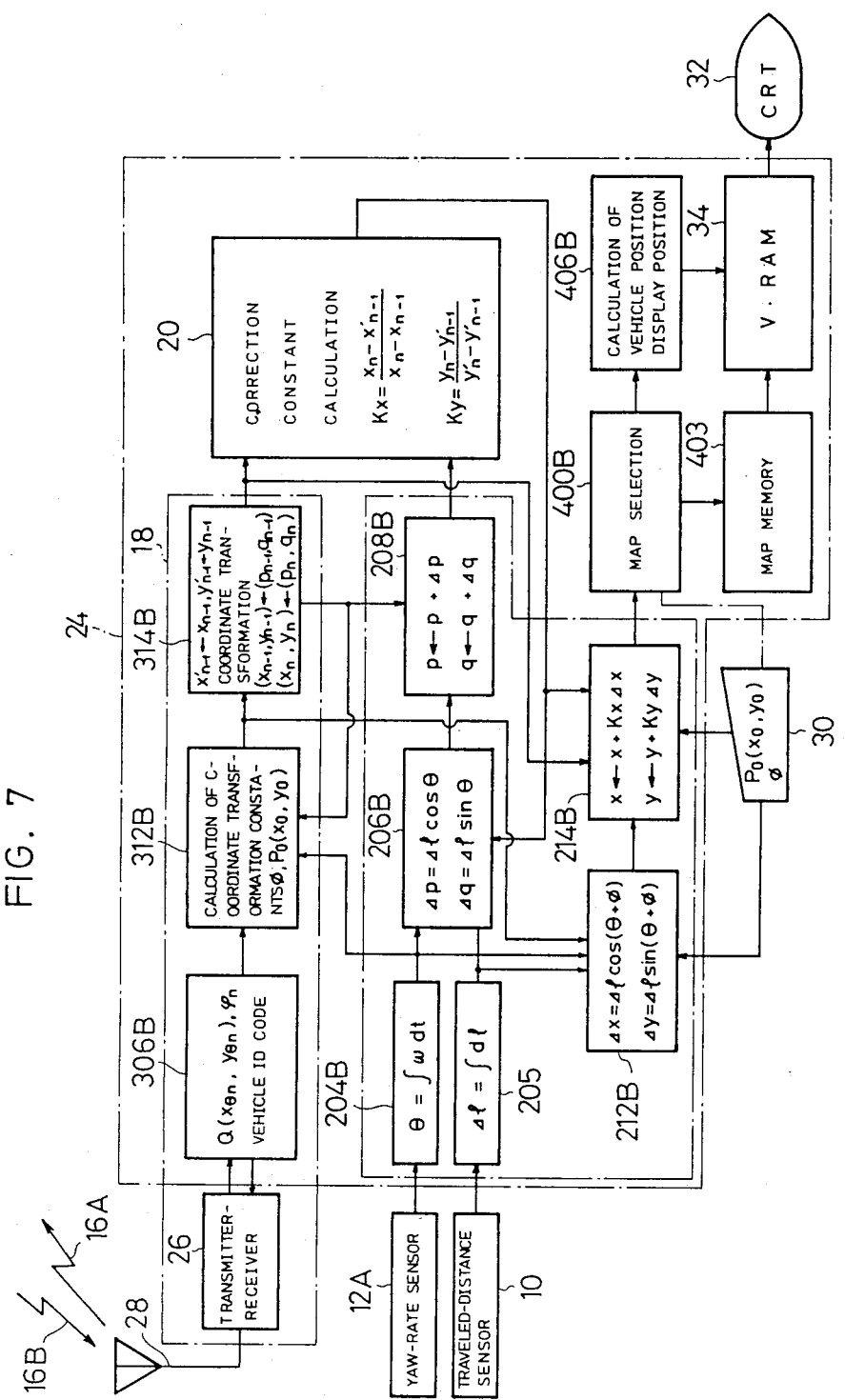
FIG. 7 is a block diagram of the arrangement of one embodiment of the present invention.

Referring first to FIG. 7 which shows the arrangement of the embodiment, a microcomputer 24 is supplied with signals from the traveled-distance sensor 10 and a yaw-rate sensor 12A. The traveled-distance sensor 10 is adapted to output one pulse every time a wheel rotates a predetermined angle, whereby it is possible to detect a distance traveled by counting the number of pulses. The yaw-rate sensor 12A is a gas-rate gyro which is adapted to output a voltage proportional to a yaw rate of the vehicle.

On the other hand, the microcomputer 24 is arranged such that inquiry signals which include the ID code of the vehicle are transmitted to a fixed station (not shown) by means of a radio wave 16A from an antenna 28 through a transmitter-receiver 26. Receiving the radio wave 16A, the fixed station transmits signals which include the vehicle ID code and the absolute position of the fixed station to the vehicle by means of a radio wave 16B. The radio wave 16B is received by the antenna 28, and the signals are supplied to the microcomputer 24 through the transmitter-receiver 26. The antenna 28 possesses directivity and is rotating. It is therefore possible to detect the radio wave arrival angle $\phi$ with respect to the vehicle advancing direction from a change in intensity of the received radio wave with the rotation of the antenna 28.

Input information about the initial position $P_0$ ($x_0$, $y_0$) and the initial bearing angle $\Phi$ from a keyboard 30 equipped with a ten-key unit and command keys are input to the microcomputer 24.

The microcomputer 24 is adapted to calculate the present vehicle position on an absolute coordinate system (a geographical coordinate system in which, for example, the x-axis represents the eastward direction and the y-axis the northward direction) and instructs a CRT 32 to display a map and a present vehicle position on the map.

FIG. 7 shows the microcomputer 24 in a state in which it is divided into functional blocks. The microcomputer 24 further has input/output interfaces which are not shown in FIG. 7. For example, a signal from the yaw-rate sensor 12A is converted into a digital signal by an A/D converter of the input interface.

It is to be noted that the number of fixed stations may be either plural, as shown in FIG. 2, or singular, as shown in FIG. 3.

The functions of the microcomputer 24 will now be described in accordance with flow charts respectively shown in FIGS. 8 to 11.

Figure 8:
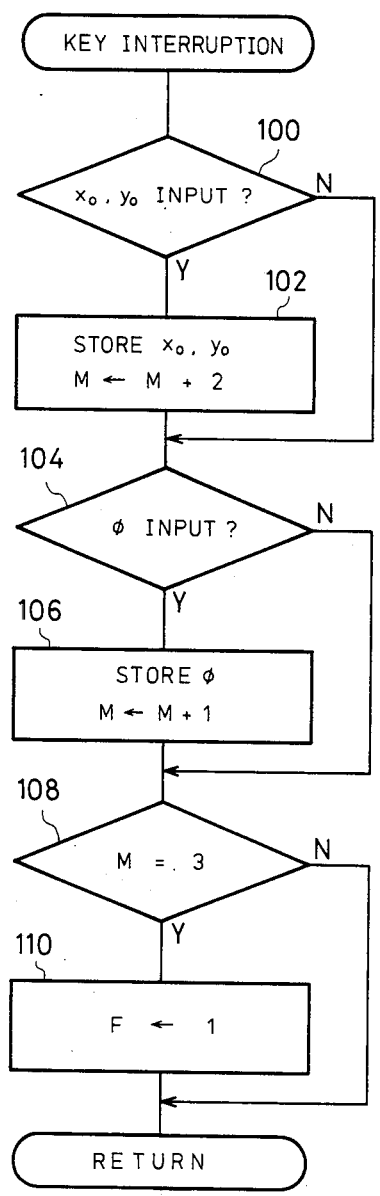
FIGS. 8 to 11 are flow charts employed to describe various functional blocks shown in FIG. 7.

FIG. 8 shows an interruption processing which is executed when a key-input is supplied from the keyboard 30. When the initial position $P_0$ ($x_0$, $y_0$) is input (a step 100), the initital position $P_0$ ($x_0$, $y_0$) is stored in an RAM, and 2 is added to the value of M (a step 102). The value of M has already been initialized to 0 in a main routine, not shown. The value of M represents the determined number of constants, that is, ($x_0$, $y_0$) and $\Phi$, which determine the coordinate transformation formula (1), or the number of such constants which can be determined. When the initial bearing angle $\Phi$ of the vehicle advancing direction is input (a step 104), the initial bearing angle $\Phi$ is stored in the RAM, and 1 is added to the value of M (a step 106). When M=3, a flag F which represents the fact that the coordinate transformation formula (1) has been determined is set (a step 110). Then, the process returns to the main routine.

Figure 9:
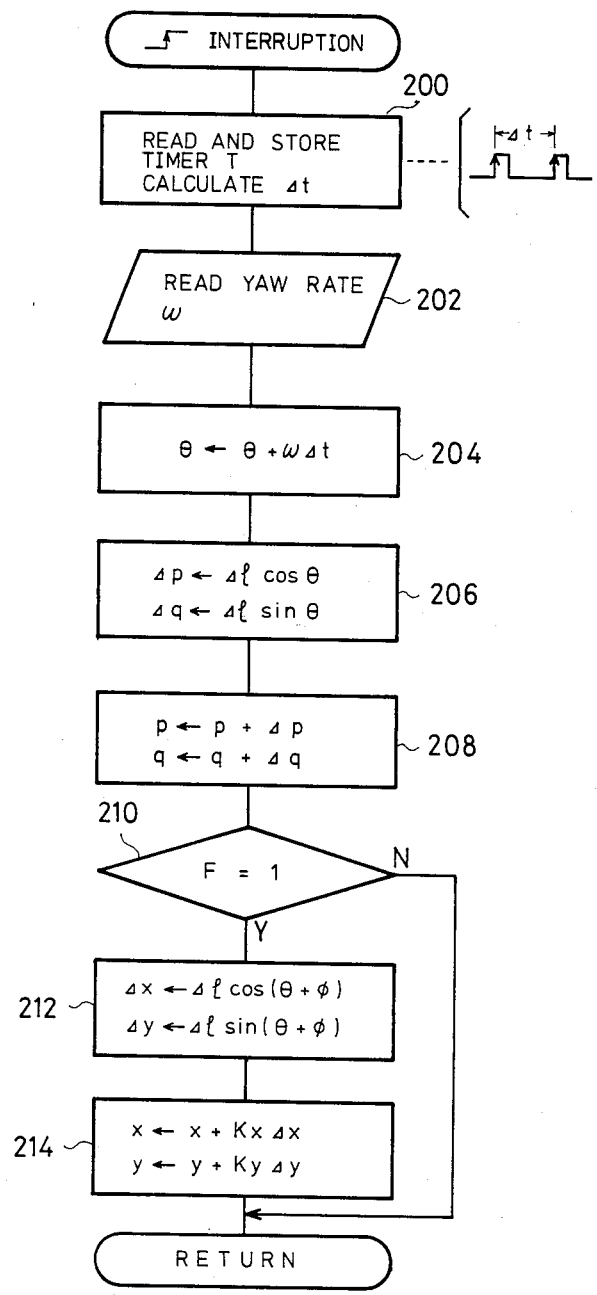

FIG. 9 shows the processing carried out in the relative position calculating means 14. In response to the rise of the pulse delivered from the traveled-distance sensor 10, a CPU is interrupted, and this processing is started. The microcomputer 24 is provided with a timer T (not shown) and reads off the time on the timer T as well as storing it. The time $\Delta t$ is calculated (a step 200) by subtracting the previous time reading (the time registered by the previous pulse from the traveled-distance sensor 10) from the present time reading (the time registered by the present pulse from the traveled-distance sensor 10). Then, the yaw rate $\omega$ is read from the yaw-rate sensor 12A (a step 202), and the vehicle advancing direction angle $\theta$ with respect to the p-axis is renewed. In other words, a value obtained by adding $\omega \Delta t$ to $\theta$ is employed as a new value for $\theta$ (a step 204; a block 204B). The initial value of $\theta$ is 0, and the p-axis is set such as to extend in the initial advancing direction of the vehicle (see FIG. 2). Then, components $\Delta p$ and $\Delta q$ of the movement $\Delta l$ of the vehicle are calculated on the p-q orthogonal coordinate system (the relative coordinate system) whose origin is defined by the initial vehicle position, the movement $\Delta l$ corresponding to one pulse delivered from the traveled-distance sensor 10, from the following formulae: $\Delta p = \Delta l \cdot \cos \theta$ and $\Delta q = \Delta l \cdot \sin \theta$ (a step 206; a block 206B). Then, the relative vehicle position (p, q) is renewed. More specifically, a value obtained by adding $\Delta p$ to the value of p is employed as a new value for p, while a value obtained by adding $\Delta q$ to the value of q is employed as a new value for q (a step 208; a block 208B).

Then, if the flag F has been reset (a step 210), the process returns to the main routine. If the flag F has been set (the step 210), that is, when the coordinate transformation formula employed to transform the position on the relative coordinate system to the x-y orthogonal coordinate system (the absolute coordinate system) has been determined, the components $\Delta x$ and $\Delta y$ in $\Delta l$ on the x-y orthogonal coordinate system are calculated in accordance with the following formulae: $\Delta x = \Delta l \cdot \cos(\theta + \Phi)$ and $\Delta y = \Delta l \cdot \sin(\theta + \Phi)$ (a step 212; a block 212B). Then, the absolute vehicle position (x, y) is renewed (a step 214). In the step 214, $K_x$ and $K_y$ represent correction constants, described later, whose initial values are 1.

Figure 10:
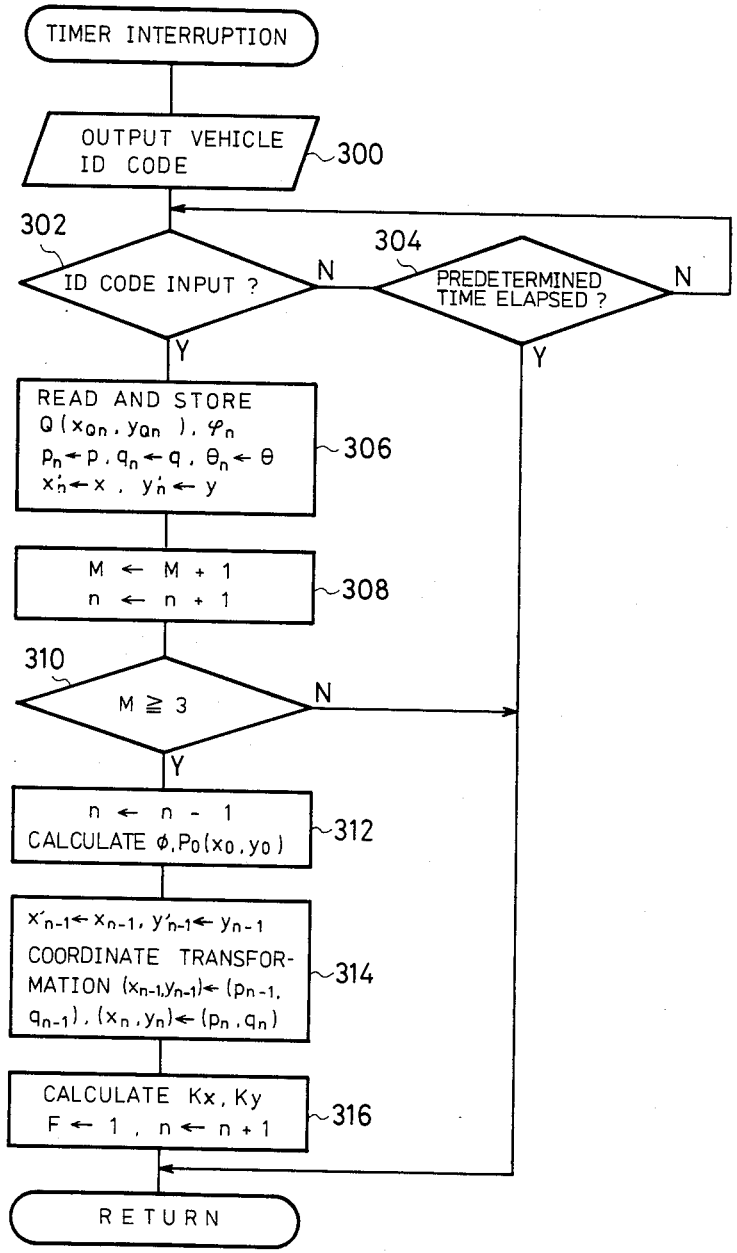

Referring next to FIG. 10 which shows the processing carried out in the absolute position calculating means 18 and the correction constant calculating means 20, this processing is started by a timer interruption of the CPU which takes place every time a predetermined period of time (e.g., one second) elapses. When this interruption is generated, the inquiry information including the vehicle ID code which has been stored in an ROM is read out and is modulated by the transmitter-receiver 26, the radio wave 16A being transmitted from the antenna 28 (a step 300). Receiving the radio wave 16A, the fixed station transmits to the vehicle information including the vehicle ID code and the absolute position of the fixed station by means of the radio wave 16B. If it is not possible for the vehicle to receive the vehicle ID code even when a predetermined period of time has elapsed from the transmission of the radio wave 16A (steps 302 and 304), the process returns to the main routine. When the vehicle receives the vehicle ID code within the predetermined period of time (the step 302), the signal which is obtained subsequently to the vehicle ID code is demodulated and decoded such as to read and store the position Q ($x_{Qn}$, $y_{Qn}$) of the fixed station. Further, the radio wave arrival angle $\phi_n$ is calculated from a change in intensity of the received radio wave in accordance with the rotation of the antenna 28 and then stored. Further, the respective values of p and q obtained in the step 208 are stored as $p_n$ and $q_n$, and the respective values of x and y obtained in the step 214 are also stored as $x'_n$ and $y'_n$ (a step 306; a block 306B). Then, the respective values of M and n are incremented (a step 308), and if M<3, the process returns to the main routine. If M≧3, the value of n is decremented, and the respective values of the coordinate transformation constants $\Phi$ and $P_0$ ($x_0$, $y_0$) are calculated (a step 312; a block 312B).

In the case where the initial position and the initial bearing angle have not been input, the values of $\Phi$ and $P_0$ ($x_0$, $y_0$) are calculated (renewed) by the following formulae respectively corresponding to the formulae (2), (3) and (4):

$$Z_{Qn-2} = x_0 + iy_0 + (p_{n-2} + iq_{n-2} + r_{n-2}e^{i(\theta_{n-2} + \phi_{n-2})})e^{i\Phi} \quad (2)'$$

$$Z_{Qn-1} = x_0 + iy_0 + (p_{n-1} + iq_{n-1} + r_{n-1}e^{i(\theta_{n-1} + \phi_{n-1})})e^{i\Phi} \quad (3)'$$

$$ZQ_n = x_0 + iy_0 + (p_n + iq_n + r_n e^{i(\theta_n + \Phi_n)})e^{i\Phi} \quad (4)'$$

Figure 12:
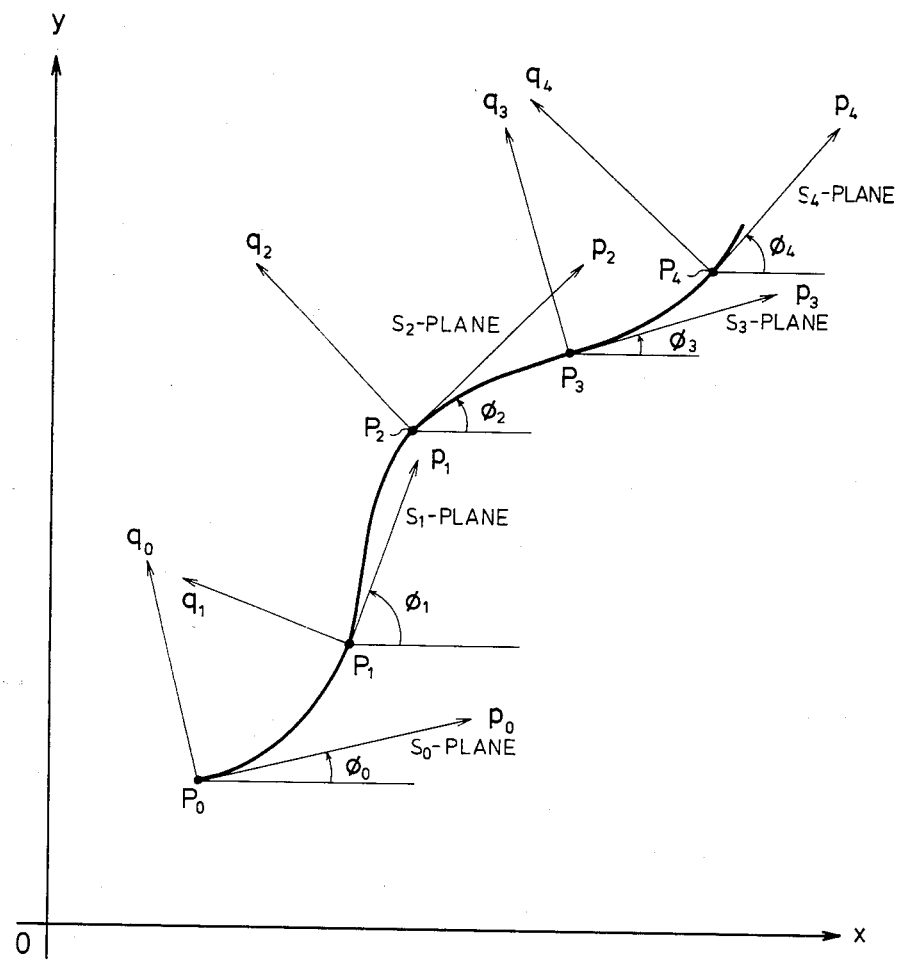
FIG. 12 is a graph showing another example of the process of successively renewing a relative coordinate system employed in the present invention.

In consequence, the positions of the vehicle obtained by the inertial navigation method are corrected by sets of vehicle positions ($P_1$, $P_2$ and $P_3$), ($P_2$, $P_3$ and $P_4$), ($P_3$, $P_4$ and $P_5$) . . . where the information about the radio wave arrival angles are obtained, whereby the generation of the accumulated error is suppressed. It is to be noted that the origin of the p-q orthogonal coordinate system may be successively renewed from $P_0$ to $P_1$, $P_2$, $P_3$ . . . (see FIG. 12). In such a case, the relative position of the present vehicle position is near the origin of each of the relative coordinate systems at all times. It may therefore be understood that the generation of accumulated error is effectively suppressed.

When the initial bearing angle $\Phi$ alone has been input through the keyboard 30 and when n=2, the respective values of $x_0$ and $y_0$ are calculated from the formulae (3)' and (4)'. On the other hand, when n≧3, $\Phi$ may be regarded as undetermined, and the respective values of $\Phi$ and $P_0(x_0, y_0)$ may be calculated ($\Phi$ may be renewed) in accordance with the formulae (2)', (3)' and (4)'.

When the initial position $P_0(x_0, y_0)$ alone has been input through the keyboard 30 and when n=1, the value of $\Phi$ is calculated from the formula (4)'. When n=2, $P_0(x_0, y_0)$ may be regarded as undetermined and the value of $P_0(x_0, y_0)$ may be calculated (renewed) in accordance with the value of $\Phi$ and the formulae (3)' and (4)'. On the other hand, when n≧3, $P_0(x_0, y_0)$ and $\Phi$ may be regarded as undetermined, and the respective values of $P_0(x_0, y_0)$ and $\Phi$ may be calculated (renewed) through the formulae (2)', (3)' and (4)'.

When both the initial position $P_0(x_0, y_0)$ and the initial bearing angle $\Phi$ have been input through the keyboard 30 and when n=1, $\Phi$ may be regarded as undetermined, and the value of $\Phi$ may be calculated (renewed) in accordance with the formula (4)'; when n=2, $P_0(x_0, y_0)$ may be regarded as undetermined, and the value of $P_0(x_0, y_0)$ may be calculated (renewed) through the formulae (3)' and (4)'; and when n≧3, both the initial position $P_0(x_0, y_0)$ and the initial bearing angle $\Phi$ may be regarded as undetermined, and the respective values of $P_0(x_0, y_0)$ and $\Phi$ may be calculated (renewed) from the formulae (2)', (3)' and (4)'.

Then, the respective values of $x_{n-1}$ and $y_{n-1}$ obtained in a step 314 in the previous processing by the coordinate transformation are stored as $x'_{n-1}$ and $y'_{n-1}$. Then, the relative coordinates $(p_{n-1}, q_{n-1})$ and $(p_n, q_n)$ are respectively transformed into absolute coordinates $(x_{n-1}, y_{n-1})$ and $(x_n, y_n)$ by employing the coordinate transformation formula (1) (a step 314; a block 314 B). The absolute coordinates $(x_{n-1}, y_{n-1})$ are renewed from the above-described previous values stored $(x'_{n-1}, y'_{n-1})$ and the magnitude of errors is thus reduced. Next, the correction constants $Kx = (x_n - x'_{n-1})/(x'_n - x'_{n-1})$ and $Ky = (y_n - y'_{n-1})/(y'_n - y'_{n-1})$ are calculated, and the flag F employed in the step 210 is set. Then, the value of n is incremented (a step 316; a block 316B). Thereafter, the process returns to the main routine.

It is to be noted that the arrangement may be such that values $Kp$ and $Kq$ are obtained by inversely transforming the denominator and the numerator on the right-hand side of each of the expressions of $Kx$ and $Ky$ by employing the coordinate transformation formula (1) ((x, y)→(p, q)), and $\Delta p$ and $\Delta q$ in the step 208 (the block 208B) are respectively multiplied by $Kp$ and $Kq$.

Figure 11:
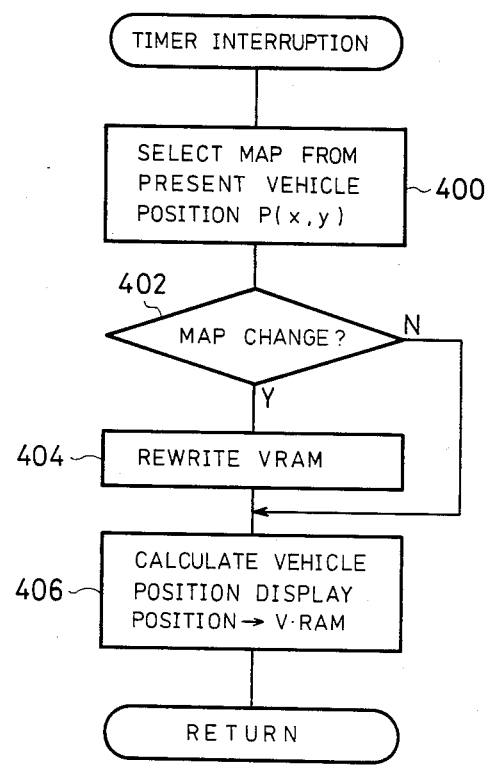

Referring next to FIG. 11, there is shown a processing of rewriting a video RAM (V·RAM 34) which is employed to display a map and a vehicle position on the CRT 32. This processing is started by a timer interruption of the CPU which takes place every predetermined period of time. It is to be noted that this processing may be started next to the step 214. First, a map to be displayed on the CRT 32 is selected (a step 400; a block 400B) from the present vehicle position P (x, y) obtained in the step 214. It is to be noted that the arrangement may be such that it is possible for a map to be selected by a key-input from the keyboard 30. To change the displayed map to another, data about a map which is to replace the map being displayed is transferred from an ROM or a disk (a block 403) employed to store maps to the V·RAM 34 so as to rewrite the V·RAM 34 (steps 402 and 404). Then, the position of the present vehicle position P (x, y) which is to be displayed on the CRT 32 is calculated (a step 406; a block 406B), and the process returns to the main routine. It is, to be noted that the data written into the V·RAM 34 is scanned by a CRT controller (not shown) and displayed on the CRT 32.

What is claimed is:

1. A vehicle position calculating apparatus comprising:
   (a) traveled-distance sensor means for detecting a distance traveled by a vehicle;
   (b) bearing sensor means for detecting a vehicle advancing direction;
   (c) relative position calculating means for calculating relative vehicle positions with respect to reference positions using an inertial navigation method employing said distance traveled and said vehicle advancing direction respectively detected by said traveled-distance sensor means and said bearing sensor means; and
   (d) absolute position calculating means for calculating absolute vehicle positions based on fixed-station absolute position information and a plurality of items of vehicle bearing information which are obtained by a radio wave transmitted from a fixed station and said relative vehicle positions calculated by said relative position calculating means at a plurality of points where respective items of vehicle bearing information are obtained;
   said relative position calculating means including means for calculating a present vehicle position by employing the successively calculated absolute vehicle positions as said reference positions.

2. A vehicle position calculating apparatus according to claim 1, wherein said absolute position calculating means includes means for obtaining vehicle bearing information by detecting an angle of arrival of the radio wave transmitted from said fixed station.

3. A vehicle position calculating apparatus according to claim 1, wherein said absolute position calculating means includes means for obtaining, at the fixed station, vehicle bearing information by detecting an angle of arrival of a radio wave transmitted from the vehicle, and transmitting the radio wave arrival angle from said fixed station to the vehicle.

4. A vehicle position calculating apparatus according to claim 1, wherein said absolute position calculating means includes means for obtaining vehicle bearing information by detecting, at the fixed station, an angle of arrival of a radio wave transmitted from the vehicle, and transmitting the radio wave arrival angle from said fixed station to the vehicle, and means for obtaining vehicle bearing information by detecting, at the vehicle, an angle of arrival of the radio wave transmitted from said fixed station.

5. A vehicle position calculating apparatus according to claim 1, further comprising correction constant calculating means for calculating a correction constant by obtaining the relationship of a vector $\vec{AB}$ between an absolute position A and an absolute position B with respect to a vector $\vec{AB'}$ between an absolute position A and an absolute position B', and said relative position calculating means is also for correcting said present vehicle position by employing said correction constant.

6. A vehicle position calculating apparatus according to claim 5, wherein said correction constant calculating means includes means for calculating correction constants which are given by $Kx=ABx/AB'x$ and $Ky=ABy/AB'y$ where ABx, AB'x, ABy and AB'y are X and Y components of the vectors $\vec{AB}$ and $\vec{AB'}$ in an X-Y orthogonal system respectively, and said relative position calculating means includes means for calculating said corrected present vehicle position by the equation $CPx=Kx\cdot CP'x$ and $CPy=Ky\cdot CP'y$ where Cp'x and CP'y represent X and Y coordinates of an uncorrected present position CP' relative to absolute position C and CPx and CPy represent the corrected present vehicle position in X and Y coordinates respectively relative to absolute position C.

7. A vehicle position calculating apparatus according to claim 6, wherein said correction constant calculating means includes means for calculating as a correction constant the angle $\beta$ made between the vectors $\vec{AB'}$ and $\vec{AB}$, and said relative position calculating means includes means for calculating said corrected present vehicle position by obtaining a vector $\vec{CP}$ which is obtained by rotating a vector $\vec{CP'}$ by the angle $\beta$ where P and P' represent the corrected and uncorrected vehicle positions respectively and C represents an absolute position C.

8. A vehicle position calculating apparatus according to claim 6, wherein said correction constant calculating means includes means for calculating a correction constant L which is given by $L=AB/AB'$, and said relative position calculating means includes means for calculating said present vehicle position P which is given by $CP=L\cdot CP'$.

9. A vehicle position calculating apparatus according to claim 6, wherein said correction constant calculating means includes means for calculating as correction constants the angle $\beta$ made between the vectors $\vec{AB'}$ and $\vec{AB}$ and L which is given by $L=AB/AB'$, and said relative position calculating means includes means for calculating said corrected present vehicle position P by obtaining a vector $\vec{CP}$ which is obtained by rotation a vector $L\cdot\vec{CP'}$ by the angle $\beta$ where P and P' represent the corrected and uncorrected vehicle positions respectively and C represents an absolute position C.

10. A vehicle position calculating apparatus according to claim 1, wherein said traveled-distance sensor means includes means for outputting one pulse every time a wheel rotates a predetermined angle.

11. A vehicle position calculating apparatus according to claim 5, wherein said traveled-distance sensor means includes means for outputting one pulse every time a wheel rotates a predetermined angle.

12. A vehicle position calculating apparatus according to claim 10, wherein said bearing sensor means is a yaw-rate sensor which detects a yaw rate of said vehicle.

13. A vehicle position calculating apparatus according to claim 11, wherein said bearing sensor means is a yaw-rate sensor which detects a yaw rate of said vehicle.

14. A vehicle position calculating apparatus according to claim 12, wherein said yaw-rate sensor is a gas-rate gyro.

15. A vehicle position calculating apparatus according to claim 13, wherein said yaw-rate sensor is a gas-rate gyro.

16. A vehicle position calculating apparatus comprising:
   (a) traveled-distance sensor means for detecting a distance traveled by a vehicle;
   (b) bearing sensor means for detecting a vehicle advancing direction;
   (c) relative position calculating means for calculating relative vehicle positions with respect to reference positions using an inertial navigation method, by employing the distance traveled and the vehicle advancing direction respectively detected by said traveled-distance sensor means and said bearing sensor means;
   (d) absolute position calculating means for calculating absolute vehicle positions from fixed-station absolute position information and a plurality of items of vehicle bearing information which are obtained by a radio wave transmitted from a fixed station and relative vehicle positions calculated by said relative position calculating means at a plurality of points where the respective items of vehicle bearing information are obtained; and
   (e) correction constant calculating means for calculating a correction constant by obtaining the relationship of a vector $\vec{AB}$ with respect to a vector $\vec{AB'}$, in which A and B represent absolute positions calculated by said absolute position calculating means and B' represents a position calculated by said relative position calculating means using the absolute position A employed as a reference position, the position B' corresponding the the absolute position B,
   said relative position calculating means including means for calculating a present vehicle position P by employing said correction constant obtained by said correction constant calculating means using an absolute position C calculated by said absolute position calculating means employed as a reference position.

17. A vehicle position calculating apparatus according to claim 16, wherein said correction constant calculating means includes means for calculating correction contants Kx and Ky which are respectively given by $Kx=ABx/AB'x$ and $Ky=ABy/AB'y$, where Bx, By, B'x and B'y respectively represent X and Y components of the vectors $\vec{AB}$ and $\vec{AB'}$ respectively and said relative position calculating means includes means for calculating the present vehicle position P relative to an absolute position C as $CPx=Kx\cdot CP'x$ and $CPy=Ky\cdot CP'y$ where P, represents said present vehicle position obtained when no correction is made and CPx and CPy and X and Y coordinates of $\vec{CP}$, and CP'x and CP'y are X and Y coordinates of $\vec{CP'}$.

18. A vehicle position calculating apparatus according to claim 16, wherein said correction constant calculating means includes means for calculating as a correction constant the angle $\beta$ made between the vectors $\vec{AB'}$ and $\vec{AB}$, and said relative position calculating means includes means for calculating the present vehicle position P by obtaining a vector $\vec{CP}$ which is obtained by rotating a vector $\vec{CP'}$ between said absolute position C, and P', which is a present vehicle position when no correction is made, by the angle $\beta$.

19. A vehicle position calculating apparatus according to claim 16, wherein said correction constant calculating means includes means for calculating a correction constant L which is given by $L=AB/AB'$, and said relative position calculating means includes means for calculating the present vehicle position P relative to the absolute position C which is given by $CP=L\cdot CP'$ where P' is a present vehicle position when no correction is made.

20. A vehicle position calculating apparatus according to claim 16, wherein said correction constant calculating means includes means for calculating as correction constants the angle $\beta$ made between, the vectors $\vec{AB'}$ and $\vec{AB}$ and L which is given by $L=AB/AB'$, and said relative position calculating means includes means for calculating the present vehicle position P by obtaining a vector $\vec{CP}$ which is obtained by rotating a vector $L\cdot \vec{CP'}$ by the angle $\beta$ where P' is a present vehicle position when no correction is made.

21. A vehicle position calculating apparatus comprising:
   (a) traveled-distance sensor means for detecting a distance traveled by a vehicle;
   (b) bearing sensor means for detecting a vehicle advancing direction;
   (c) relative position calculating means for calculating a relative vehicle position with respect to a reference position, using an inertial navigation method employing the traveled distance detected by said traveled-distance sensor means and the vehicle advancing direction detected by said bearing sensor means;
   (d) absolute position calculating means for calculating an absolute vehicle position on the basis of a plurality of sets of fixed-station absolute position information and radio wave arrival direction information which are obtained in succession from a radio wave transmitted from at least one fixed station and the relative vehicle positions calculated by said relative position calculating means, at a plurality of points where the respective sets are obtained, the calculated absolute vehicle position being employed as a new reference position;
   (e) correction factor calculating means for calculating a correction factor on the basis of a relationship between the absolute vehicle position obtained by said absolute position calculating means and the relative vehicle position corresponding to the absolute vehicle position and obtained by said relative position calculating means; and
   (f) present vehicle position calculating means for calculating a present vehicle position by correcting a relative vehicle position with respect to said new reference position, using said correction factor.

* * * * *